United States Patent
Tsukamoto (10) Patent No.: US 10,186,906 B2
(45) Date of Patent: Jan. 22, 2019

(54) POWER-TRANSMITTING APPARATUS CAPABLE OF WIRELESSLY TRANSMITTING POWER TO POWER-RECEIVING APPARATUS AND METHOD FOR CONTROLLING THE SAME

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 15/297,859

(22) Filed: Oct. 19, 2016

(65) Prior Publication Data
US 2017/0117750 A1    Apr. 27, 2017

(30) Foreign Application Priority Data
Oct. 26, 2015   (JP) ................. 2015-209477

(51) Int. Cl.
| | | |
|---|---|---|
| *H02J 50/10* | (2016.01) | |
| *H02J 50/60* | (2016.01) | |
| *H02J 50/80* | (2016.01) | |
| *H02J 7/02* | (2016.01) | |
| *H02J 7/00* | (2006.01) | |

(52) U.S. Cl.
CPC .............. *H02J 50/10* (2016.02); *H02J 50/60* (2016.02); *H02J 50/80* (2016.02); *H02J 7/0042* (2013.01); *H02J 7/025* (2013.01); *H02J 2007/0001* (2013.01)

(58) Field of Classification Search
CPC ........................................ H02J 50/10
USPC ........................................... 307/104
See application file for complete search history.

(56) References Cited

U.S. PATENT DOCUMENTS

| | | | |
|---|---|---|---|
| 2015/0054454 A1* | 2/2015 | White, II | H04B 5/0075 320/108 |
| 2015/0349542 A1* | 12/2015 | Yamamoto | G01V 3/10 307/104 |

FOREIGN PATENT DOCUMENTS

JP    2012-228121 A    11/2012

* cited by examiner

*Primary Examiner* — Joseph Chang
(74) *Attorney, Agent, or Firm* — Canon U.S.A., Inc. IP Division (57) ABSTRACT

A power-transmitting apparatus that wirelessly transmits power to a power-receiving apparatus includes an antenna that wirelessly outputs power, a transmitted power adjusting unit that adjusts power to be transmitted to the power-receiving apparatus, a foreign substance detection unit that detects the presence of a foreign substance between the power-receiving apparatus and the power-transmitting apparatus, and a control unit that controls the transmitted power adjusting unit based on a detection result of the foreign substance detection unit, where the foreign substance detection unit determines, based on a detection threshold determined according to maximum power transmittable to the power-receiving apparatus, whether the foreign substance necessitates control of power to be transmitted to the power-receiving apparatus.

9 Claims, 6 Drawing Sheets

POWER-TRANSMITTING APPARATUS CAPABLE OF WIRELESSLY TRANSMITTING POWER TO POWER-RECEIVING APPARATUS AND METHOD FOR CONTROLLING THE SAME

BACKGROUND

Field

Aspects of the present disclosure generally relate to a power-transmitting apparatus and a method for controlling the same.

Description of the Related Art

Recently, a power-transmitting apparatus capable of wirelessly transmitting power to an electronic device has been known.

In a case of wireless power transmission, power transmission efficiency can deteriorate when there is a foreign substance between a power-transmitting apparatus and a power-receiving apparatus. Some foreign substances can cause heat to generate by transmitted power. Accordingly, for example, Japanese Patent Laid-Open No. 2012-228121 proposes a method in which detection of foreign substances present between a power-transmitting apparatus and a power-receiving apparatus (electronic device) is performed with a fixed foreign substance detection threshold regardless of the magnitude of transmitted power, and when a foreign substance is detected, the transmitted power is reduced and power transmission is continued.

With technology described in Japanese Patent Laid-Open No. 2012-228121, as a result of adopting the fixed foreign substance detection threshold regardless of the magnitude of transmitted power, erroneous detection of foreign substances is more likely to occur. There may be a case where during low power transmission that does not affect foreign substances, a non-existing foreign substance is erroneously detected and the power transmission is unnecessarily limited. There may also be a case where during high power transmission which affects foreign substances, an actually existing foreign substance cannot be detected and the power transmission is continued.

SUMMARY

A power-transmitting apparatus that wirelessly transmits power to a power-receiving apparatus includes: an antenna configured to wirelessly output power; a transmitted power adjusting unit configured to adjust power to be transmitted to the power-receiving apparatus through the antenna; a foreign substance detection unit configured to detect the presence of a foreign substance between the power-receiving apparatus and the power-transmitting apparatus; and a control unit configured to control the transmitted power adjusting unit in accordance with a detection result of the foreign substance detection unit, in which the foreign substance detection unit is configured to determine, in accordance with a foreign substance detection threshold determined according to maximum power transmittable to the power-receiving apparatus, whether the foreign substance necessitates control of power to be transmitted to the power-receiving apparatus.

Further features of aspects of the present invention will become apparent from the following description of exemplary embodiments (with reference to the attached drawings).

DESCRIPTION OF THE EMBODIMENTS

Hereinbelow, embodiments of the invention will be described in detail with reference to the drawings. However, these embodiments are not seen to be limiting. Regarding the expression "wireless power transmission", the term "noncontact" or "contactless" may be used instead of the term "wireless", where these terms have the same meaning.

First Embodiment

Figure 1:
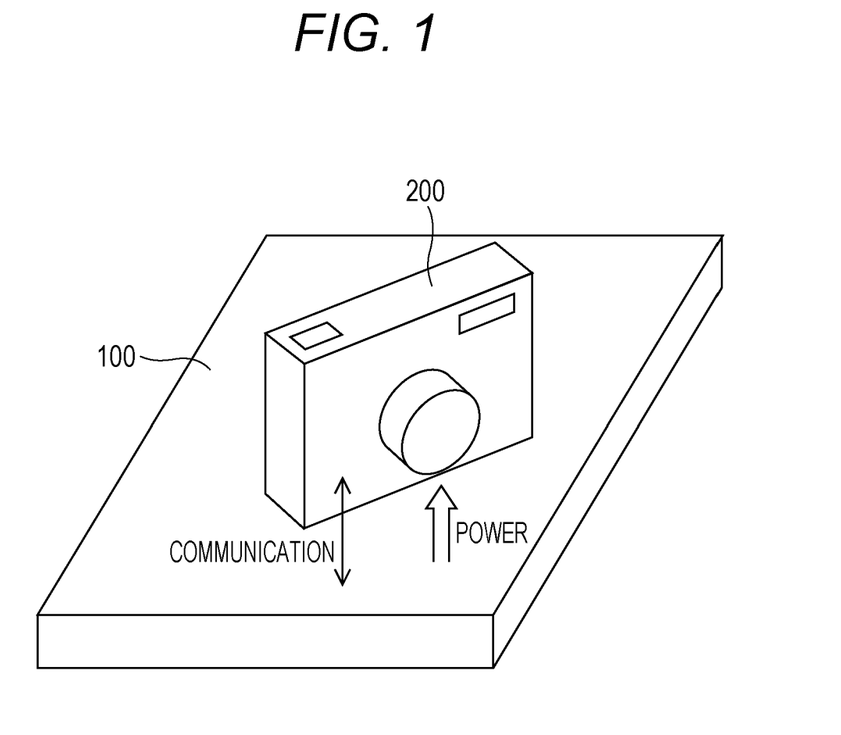
FIG. 1 is a view for explaining an appearance and a layout relationship of an embodiment of a power transmission system.

FIG. 1 is a perspective view illustrating a use state of an embodiment of a power transmission system according to aspects of the embodiments. The power transmission system of the embodiment includes a power-transmitting apparatus 100 and an electronic device 200 as a power-receiving apparatus that receives power wirelessly transmitted from the power-transmitting apparatus 100. In the illustrated embodiment, the electronic device 200 as a power-receiving apparatus is placed on the power-transmitting apparatus 100 and wireless power transmission is performed to the electronic device 200 from the power-transmitting apparatus 100. Aspects of the embodiments can also be applied to other wireless power transmission, such as wireless power transmission to automobiles. The wireless power transmission from the power-transmitting apparatus 100 to the electronic device 200 (power-receiving apparatus) can be performed by an electromagnetic induction method or an electromagnetic resonance method.

Figure 2:
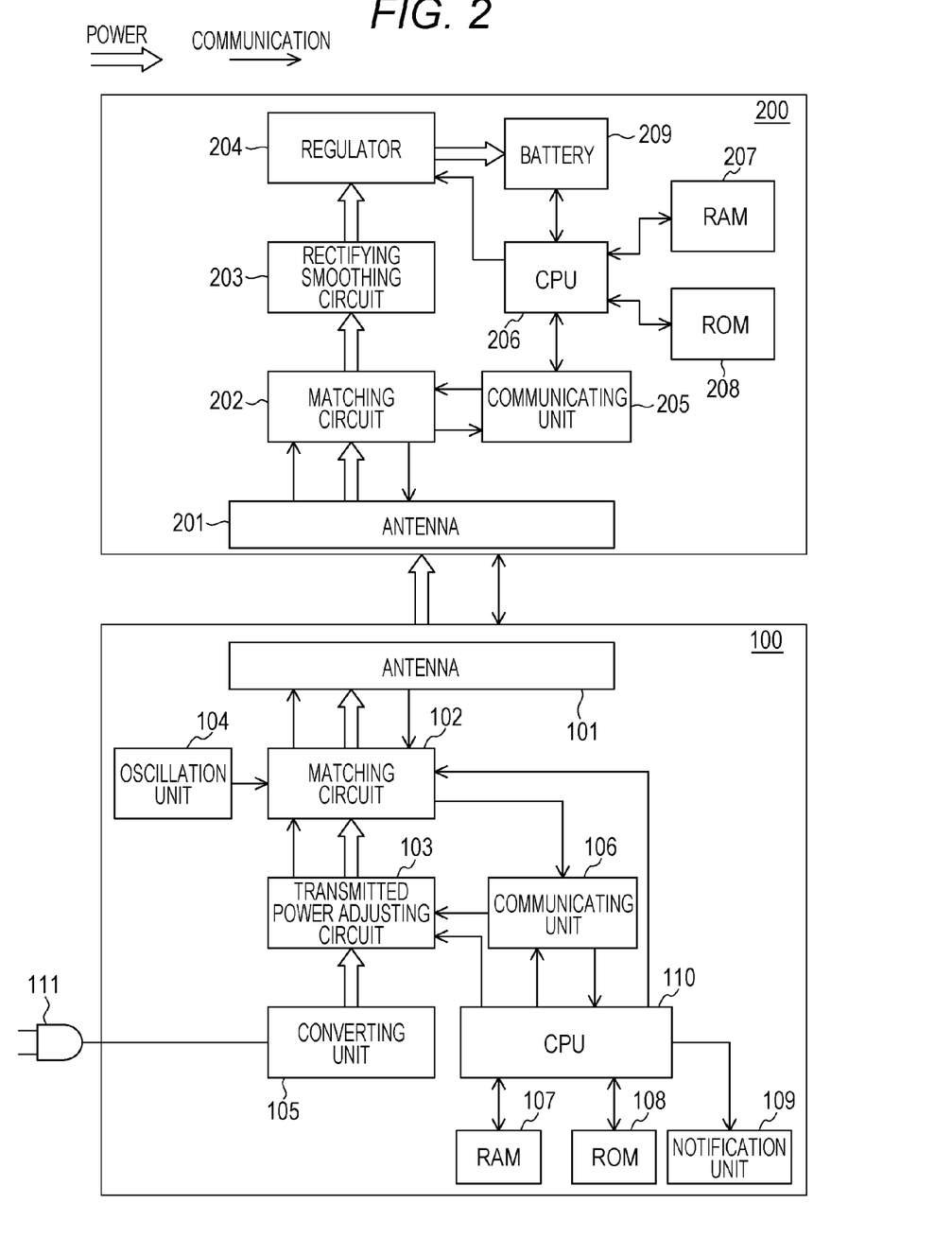
FIG. 2 is a diagram for explaining a schematic configuration of the embodiment.

FIG. 2 is a block diagram illustrating a schematic configuration of the power-transmitting apparatus 100 and the electronic device 200. As illustrated in FIG. 2, the power-transmitting apparatus 100 wirelessly supplies power to the electronic device 200 from an antenna 101, and the electronic device 200 receives the power wirelessly transmitted from the power-transmitting apparatus 100 with an antenna 201. In addition, the power-transmitting apparatus 100 and the electronic device 200 can communicate a control signal and data with each other through the antennas 101 and 201. The electronic device 200 stores power supplied from the power-transmitting apparatus 100 in a battery 209. In the present embodiment, the electronic device 200 is a portable device that operates by power supplied from the battery 209. In other embodiments, the electronic device 200 can be a movable member such as a car, a mobile device such as a digital camera and a mobile phone, or a memory or a battery with a wireless interface.

In the present embodiment, the power-transmitting apparatus 100 starts transmitting power wirelessly to the electronic device 200 when detecting that the electronic device 200 is present in a predetermined area. The predetermined area refers to, for example, an area where the electronic device 200 can communicate with the power-transmitting apparatus 100.

The configuration and a basic function of the power-transmitting apparatus 100 will be described with reference to FIG. 2. The antenna 101 is electromagnetically coupled to the antenna 201 of the electronic device 200, and used for wireless power transmission to the electronic device 200 and communication with the electronic device 200. The antenna 101 is in a coiled shape, and wirelessly outputs external to the power-transmitting apparatus 100 an electromagnetic wave that transports power and a communication signal. The antenna 101 is coupled to the antenna 201 with an inductance component, but can be coupled in a different manner, such as with a capacitance component.

A matching circuit 102 is a circuit that matches impedance between the antenna 101 and a transmitted power adjusting circuit 103, and adjusts a resonance frequency of the antenna 101. The matching circuit 102 includes a circuit obtained by combining passive elements including an inductance component or a capacitance component in series parallel, and the combination of the passive elements is appropriately selected in accordance with a desired matching state. By using an element including a variable value as the passive element of the matching circuit 102, or by making it possible to switch connection thereof, a CPU 110 can control characteristics of the matching circuit 102 in accordance with a condition or a position of the electronic device 200.

The transmitted power adjusting circuit 103 adjusts an alternate current signal output from an oscillation unit 104 into an alternate current signal (power signal) with predetermined power, and supplies the alternate current signal to the matching circuit 102. The transmitted power adjusting circuit 103 includes, for example, a power amplifying unit including a switching amplifier (not illustrated), and a power adjusting unit (not illustrated) that adjusts an output DC voltage from a converting unit 105 into a DC voltage needed by the transmitted power adjusting circuit 103. The power adjusting unit includes, for example, a DC-to-DC converter that changes a voltage input from the converting unit 105 into a predetermined voltage in accordance with a control signal from a communicating unit 106 or the CPU 110.

The oscillation unit 104 is a circuit that constantly generates an alternate current signal with a predetermined frequency and supplies the signal to the transmitted power adjusting circuit 103, and includes a crystal vibrator. The predetermined frequency can be a frequency suitable for wireless power transmission and within a frequency band in which a power signal up to approximately 50 W can be emitted into a space. Currently, the frequency band is, for example, a frequency band for an ISM band belonging to an HF band such as 6.78 MHz or 13.56 MHz, or a frequency band belonging to an LF band such as several hundred KHz.

The converting unit 105 includes an alternate current/direct current converting circuit that generates a direct current voltage necessary for each unit from commercial alternate current power input from a power supply connector 111 and supplies the direct current voltage. The power supply connector 111 is connected to an outlet of a commercial alternate current power supply. An internal circuit of the power-transmitting apparatus 100 is operated by power supplied from the converting unit 105.

The communicating unit 106 is a unit for communicating data including a control signal with (a communicating unit 205) the electronic device 200, and uses, for the communication, modulation and demodulation of a voltage signal relating to a circuit unit including the antenna 101, the matching circuit 102, and the transmitted power adjusting circuit 103. When transmitting data, the communicating unit 106 receives, from the CPU 110, data to be transmitted that has been encoded based on a predetermined protocol stored in a ROM 108, and inputs the data to the transmitted power adjusting circuit 103 through a modulation circuit to modulate a transmission signal. In accordance with a signal input by the communicating unit 106 to the transmitted power adjusting circuit 103, a signal output from the transmitted power adjusting circuit 103 is subjected to amplitude modulation, and the data can be transmitted through the antenna 101. When receiving data, the communicating unit 106 detects a change in a voltage or a current in the matching circuit 102, and demodulates data to be received through a demodulation circuit including a filer, a comparator, and a switch.

Various protocols can be used as a protocol for data communication between the power-transmitting apparatus 100 and the electronic device 200. For example, a protocol compatible with a protocol for short range wireless communication defined by ISO 14443, ISO 15693, or a near field communication (NFC) standard can be used.

A RAM 107 is a rewritable memory and stores a computer program for controlling operations of respective units in the power-transmitting apparatus 100, data including parameters regarding operations of respective units, and data received by the communicating unit 106 from the electronic device 200. The RAM 107 stores a management table used for management of a target to which the power-transmitting apparatus 100 transmits power. In the management table stored in the RAM 107, information included in device information acquired by the power-transmitting apparatus 100 from the electronic device 200 is registered.

The ROM 108 stores a computer program for controlling operations of respective units in the power-transmitting apparatus 100, information including parameters regarding operations of respective units, and a program regarding a communication method by which the power-transmitting apparatus 100 communicates with the electronic device 200.

A notification unit 109 notifies a user whether the power-transmitting apparatus 100 can transmit power to the electronic device 200. The notification unit 109 includes a display and/or a buzzer.

The CPU 110 is a unit for controlling the power-transmitting apparatus 100 as a whole, reads a program stored in the ROM 108, and controls an operation of the power-transmitting apparatus 100. Specifically, the CPU 110 controls circuit switching and adjustment of values of variable passive elements of the matching circuit 102. The CPU 110 adjusts an amount of power to be transmitted to the electronic device 200 by controlling the transmitted power adjusting circuit 103. The CPU 110 measures transmitted power output from the transmitted power adjusting circuit 103 by using an AD converting function included therein. The CPU 110 can transmit and receive a command and a control signal to and from the electronic device 200 through the communicating unit 106. The command includes identification information for identifying a destination and a command code that indicates an operation instructed by the command.

Components of the electronic device 200 and basic functions thereof will now be described. The antenna 201 receives power emitted from the antenna 101, and mediates, to and from the antenna 101, a signal communicated between the power-transmitting apparatus 100 and the electronic device 200. The antenna 201 is in a coiled shape and coupled to the antenna 101 with an inductance component, but can be electrostatically coupled thereto.

The matching circuit 202 is a circuit that matches impedance between the antenna 201 and a rectifying smoothing circuit 203, and adjusts a resonance frequency of the antenna 201. As with the matching circuit 102, the matching circuit 202 includes a circuit obtained by combining passive elements including an inductance component or a capacitance component in series parallel, and the combination of the passive elements is appropriately selected in accordance with a desired matching state. An element having a variable value is used as the passive element of the matching circuit 202, or connection thereof can be switched, and a CPU 206 controls values or switching of the passive elements of the matching circuit 202 in accordance with a mode or a load status of the electronic device 200.

The rectifying smoothing circuit 203 is a circuit that converts an alternate current power signal from the matching circuit 202 into a direct current, and includes a diode and a condenser.

A regulator 204 is a circuit that converts a voltage signal output from the rectifying smoothing circuit 203 into a predetermined voltage value. The regulator 204 supplies a voltage with the generated voltage value as a power supply to each unit of the electronic device 200. The regulator 204 charges the battery 209 under the control of the CPU 206.

The communicating unit 205 is a unit for communicating various data with the communicating unit 106 of the power-transmitting apparatus 100, and uses modulation and demodulation of a voltage signal relating to a circuit unit including the antenna 201 and the matching circuit 202, for the communication. When receiving data, the communicating unit 205 detects a change in a voltage or a current in the matching circuit 202 and demodulates the received data. The communicating unit 205 supplies the received data to the CPU 206, and the CPU 206 decodes the data based on a predetermined protocol stored in a ROM 208. When transmitting data, the CPU 206 supplies transmitted data encoded based on a predetermined protocol stored in the ROM 208 to the communicating unit 205, and the communicating unit 205 modulates the transmitted data from the CPU 206. The transmitted data thus modulated is transferred to the power-transmitting apparatus 100 through the matching circuit 202 and the antenna 201, and input to the communicating unit 106 through the antenna 101 and the matching circuit 102. The modulation circuit in the communicating unit 205 includes a switch and a resistor. By changing a load in accordance with the transmitted data, load modulation is applied and data is transmitted to the power-transmitting apparatus 100 through the antenna 201.

The CPU 206 is a unit for controlling the electronic device 200 as a whole, reads a program stored in the ROM 208, and controls an operation of the electronic device 200. Specifically, the CPU 206 controls circuit switching and adjustment of values of variable passive elements of the matching circuit 202. By controlling the regulator 204, the CPU 206 controls charging of the battery 209. The CPU 206 can detect, by using the AD converting function included therein, power remaining in the battery 209 and control the charging while performing switching among trickle charging control, high speed charging control, constant-voltage control, and constant-current control in accordance with the detected remaining battery capacity.

The CPU 206 can transmit and receive a command and a control signal to and from the power-transmitting apparatus 100 through the communicating unit 205. Here, the command includes identification information for identifying a destination and a response signal including a result of a response to an operation instructed by the command. The CPU 206 can request, to the power-transmitting apparatus 100, a change of transmitted power using the communicating unit 205 in accordance with the remaining battery capacity of the battery 209.

A RAM 207 is a rewritable memory and stores a computer program for controlling operations of respective units in the electronic device 200, data including parameters regarding operations of respective units, and data transmitted from the power-transmitting apparatus 100. The ROM 208 stores a computer program for controlling operations of respective units in the electronic device 200, information including parameters regarding operations of respective units. In the ROM 208, device information, power reception capability information, and display data of the electronic device 200 are stored. The device information of the electronic device 200 includes information indicating identification (ID), a manufacturer name, a device name, and date of manufacture of the electronic device 200, communication method corresponding to the electronic device 200, whether the electronic device 200 can receive power transmitted wirelessly from the power-transmitting apparatus 100.

The battery 209 is a rechargeable secondary battery that is detachable from the electronic device 200, and is for example, is a lithium ion battery. The battery 209 supplies power as a power supply to respective units of the electronic device 200.

Figure 3:
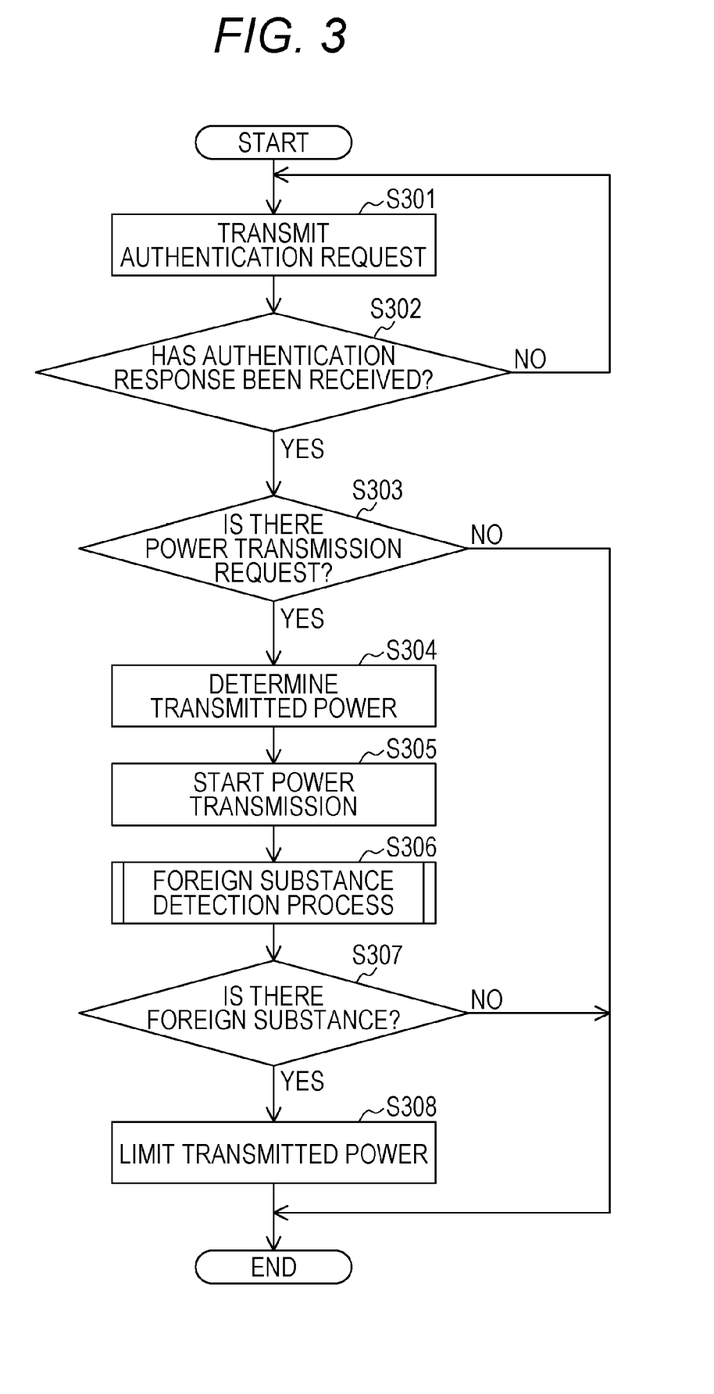
FIG. 3 is a chart for explaining an example of an operation of a power-transmitting apparatus 100.

FIG. 3 is a flowchart for explaining a power transmission operation of the power-transmitting apparatus 100. The CPU 110 executes a computer program stored in the ROM 108 to realize the process illustrated in FIG. 3. The CPU 110 repeatedly executes the process indicated by the flowchart illustrated in FIG. 3 at fixed time intervals.

In Step S301, the CPU 110 transmits an authentication request to the electronic device 200 through the communicating unit 106, and proceeds to Step S302. The CPU 110 transmits an authentication command to the electronic device 200 by controlling the communicating unit 106 with a predetermined communication protocol.

In Step S302, the CPU 110 determines whether an authentication response has been received from the electronic device 200. With respect to the authentication request from the power-transmitting apparatus 100, the electronic device 200 sends an authentication response signal to the power-transmitting apparatus 100 when authentication is successful. The communicating unit 106 supplies the authentication response signal from the electronic device 200 to the CPU 110. The authentication response signal from the electronic device 200 includes device information and power class information of the electronic device 200. The device information includes ID, a function, and specifications of the electronic device 200, and also includes information indicating whether the device is capable of transmitting power.

The power class information is information indicating maximum power the power-transmitting apparatus 100 can transmit and maximum power the electronic device 200 can receive, for example, low power class, middle power class, or high power class. For example, the low power class is defined as that the maximum transmittable power is 2 W and the maximum receivable power is 1 W, and the high power class is defined as that the maximum transmittable power is 15 W and the maximum receivable power is 6 W.

When there is no response from the electronic device 200 (NO in Step S302), the CPU 110 determines that the authentication response has not been received, and returns to Step S301. When there has been the authentication response from the electronic device 200 (YES in Step S302), the CPU 110 proceeds to Step S303.

In Step S303, the CPU 110 determines whether a power transmission request has been received from the electronic device 200. When the power transmission request has been received from the electronic device 200, the CPU 110 proceeds to Step S304, and when the power transmission request has not been received, the CPU 110 ends the process illustrated in FIG. 3.

In Step S304, the CPU 110 determines transmitted power that the power-transmitting apparatus 100 transmits to the electronic device 200 based on the power class information of the power-transmitting apparatus 100 and the power class information received as the authentication response from the electronic device 200. For example, when both the power-transmitting apparatus 100 and the electronic device 200 correspond to the high power class, the power-transmitting apparatus 100 can transmit power to the electronic device 200 at the high power class, and the transmitted power is a maximum of 15 W. When the power-transmitting apparatus 100 corresponds to the high power class and the electronic device 200 corresponds to the low power class, the power-transmitting apparatus 100 can transmit power to the electronic device 200 at the low power class, and the transmitted power is a maximum of 2 W. The CPU 110 proceeds to Step S305 from Step S304.

In Step S305, the CPU 110 starts transmitting power to the electronic device 200 from the power-transmitting apparatus 100. The CPU 110 controls the transmitted power adjusting circuit 103 to gradually increase a transmission output to the transmitted power determined in Step S304. The CPU 110 proceeds to Step S306 from Step S305.

In Step S306, the CPU 110 performs a foreign substance detection process for detecting a foreign substance other than the electronic device 200, and proceeds to Step S307. Details of the foreign substance detection process will be described below. In accordance with the result of the foreign substance detection process (Step S307), the CPU 110 proceeds to Step S308 in a case where a foreign substance has been detected, and ends the process illustrated in FIG. 3 in a case where no foreign substance has been detected.

In Step S308, the CPU 110 executes a process for limiting power transmission from the power-transmitting apparatus 100 to the electronic device 200. In the power transmission limiting process, the CPU 110 controls the transmitted power adjusting circuit 103 to limit a power transmission output to the extent of power sufficient to communicate with the electronic device 200. After limiting the transmitted power, the CPU 110 ends the process illustrated in FIG. 3.

In Step S304, the CPU 110 has determined the transmitted power based on the power class information of the power-transmitting apparatus 100 and the power class information of the electronic device 200. However, the power-transmitting apparatus 100 can unilaterally determine the transmitted power. In addition, the CPU 110 can determine the transmitted power based on the power class information or receivable power information received from the electronic device 200.

Figure 4:
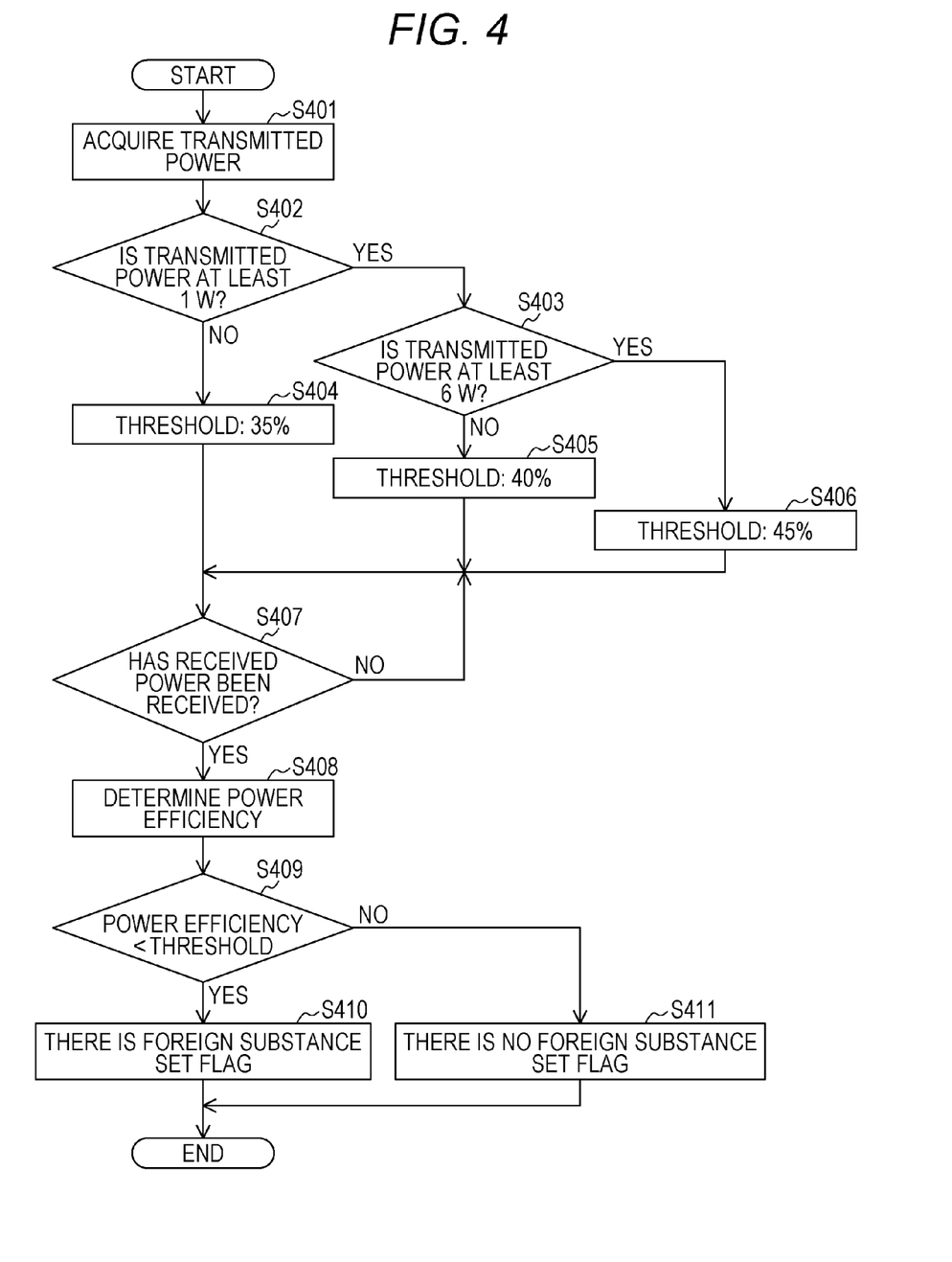
FIG. 4 is a chart for explaining an example of a foreign substance detection process performed in the power-transmitting apparatus 100.

FIG. 4 is a flowchart for explaining details of the foreign substance detection process (Step S306). A computer program that realizes the process illustrated in FIG. 4 is stored in the ROM 108, and the CPU 110 reads the computer program from the ROM 108 and executes the computer program, thereby realizing the process illustrated in FIG. 4. In the flowchart illustrated in FIG. 4, the presence of a foreign substance is determined by using a power efficiency threshold. In other words, the power efficiency threshold is adopted as a foreign substance detection threshold for determining the presence of a foreign substance.

In Step S401, the CPU 110 acquires transmitted power of the power-transmitting apparatus 100. The transmitted power is power output to the electronic device 200 from the power-transmitting apparatus 100 based on the transmitted power determined in Step S304. After acquiring the transmitted power, the CPU 110 proceeds to Step S402.

In Step S402, the CPU 110 determines whether the transmitted power acquired in Step S401 is at least 1 W. When the transmitted power acquired in Step S401 is at least 1 W (YES in Step S402), the CPU 110 proceeds to Step S403. When the transmitted power acquired in Step S401 is less than 1 W (NO in Step S402), the CPU 110 proceeds to Step S404.

In Step S403, the CPU 110 determines whether the transmitted power acquired in Step S401 is at least 6 W. When the transmitted power acquired in Step S401 is at least 6 W (YES in Step S403), the CPU 110 proceeds to Step S406. When the transmitted power acquired in Step S401 is less than 6 W (NO in Step S403), the CPU 110 proceeds to Step S405.

In Step S404, the CPU 110 sets a power efficiency threshold as a foreign substance detection threshold to 35%, and proceeds to Step S407. In Step S405, the CPU 110 sets a power efficiency threshold as a foreign substance detection threshold to 40%, and proceeds to Step S407. In Step S406, the CPU 110 sets a power efficiency threshold as a foreign substance detection threshold to 45%, and proceeds to Step S407. For example, when the transmitted power is 0.5 W, the power efficiency threshold is 35%. When the transmitted power is 3 W, the power efficiency threshold is 40%. When the transmitted power is 10 W, the power efficiency threshold is 45%. As described above, the larger the transmitted power, the higher the power efficiency threshold is set.

In Step S407, the CPU 110 determines whether received power information in the electronic device 200 has been received from the electronic device 200 through the communicating unit 106. At appropriate timing or based on a request from the power-transmitting apparatus 100, the electronic device 200 transmits power received in the electronic device 200 as the received power information to the power-transmitting apparatus 100.

When the CPU 110 receives the received power information of the electronic device 200 (YES in Step S407), the CPU 110 proceeds to Step S408. When the CPU 110 does not receive the received power information of the electronic device 200 (NO in Step S407), the CPU 110 returns to Step S407, and waits to receive the received power information from the electronic device 200.

In Step S408, the CPU 110 calculates a ratio (power efficiency) of the transmitted power acquired in Step S401 and the received power indicated by the received power information acquired in Step S407, and proceeds to Step S409. For example, when the transmitted power is 0.5 W and the received power of the electronic device 200 is 0.2 W, the power efficiency is 40%. When the transmitted power is 3 W and the received power of the electronic device 200 is 1.5 W, the power efficiency is 50%.

In Step S409, the CPU 110 compares the power efficiency obtained in Step S408 to the power efficiency threshold determined in Step S404, S405, or S406. When the power efficiency obtained in Step S408 is less than the power efficiency threshold determined in Step S404, S405, or S406 (YES in Step S409), the CPU 110 proceeds to Step S410. When the power efficiency obtained in Step S408 is greater than or equal to the power efficiency threshold determined in Step S404, S405, or S406 (NO in Step S409), the CPU 110 proceeds to Step S411.

In Step S410, the CPU 110 determines that there is a foreign substance, and sets a flag indicating that there is a foreign substance. In Step S411, the CPU 110 determines that there is no foreign substance, and sets a flag indicating that there is no foreign substance. In other words, the CPU 110 sets a foreign substance flag (foreign substance flag=1) when there is a foreign substance, and resets the foreign substance flag (foreign substance flag=0) when there is no foreign substance.

For example, when the transmitted power is 0.5 W and the received power is 0.2 W, the expression of power efficiency (40%)>power efficiency threshold (35%) is satisfied, and thereby the CPU 110 determines that there is no foreign substance. When the transmitted power is 0.5 W and the received power is 0.1 W, the expression of power efficiency (20%)<power efficiency threshold (35%) is satisfied, and thereby the CPU 110 determines that there is a foreign substance. When the transmitted power is 3 W and the received power is 1.5 W, the expression of power efficiency (50%)>power efficiency threshold (40%) is satisfied, and thereby the CPU 110 determines that there is no foreign substance. When the transmitted power is 3 W and the received power is 1 W, the expression of power efficiency (33%)<power efficiency threshold (40%) is satisfied, and thereby the CPU 110 determines that there is a foreign substance. When the transmitted power is 10 W and the received power is 5 W, the expression of power efficiency (50%)>power efficiency threshold (45%) is satisfied, and thereby the CPU 110 determines that there is no foreign substance. When the transmitted power is 10 W and the received power is 4 W, the expression of power efficiency (40%)<power efficiency threshold (45%) is satisfied, and thereby the CPU 110 determines that there is a foreign substance.

As illustrated in FIG. 4, in the present embodiment, the lower the transmitted power, the lower the power efficiency threshold for foreign substance determination is set, and the higher the transmitted power, the higher the power efficiency threshold for foreign substance determination is set. By doing so, there are fewer opportunities to determine that there is a foreign substance when the transmitted power is small. Consequently, power transmission to the electronic device 200 can be completed in a shorter period of time. On the other hand, when the transmitted power is high, foreign substances are positively determined, thereby increasing safety during the power transmission.

Although the power efficiency threshold is determined in accordance with the transmitted power in the flow illustrated in FIG. 4, the power efficiency threshold can be determined in accordance with the power classes of the power-transmitting apparatus 100 and the electronic device 200. In addition, the same result can be obtained by correcting the power efficiency determined in Step S408 with a correction coefficient determined in accordance with the transmitted power, and comparing the correction result to a fixed power efficiency threshold. The correction coefficient can be determined by a process or a class similar to those in Steps S402 to S406.

Second Embodiment

Figure 5:
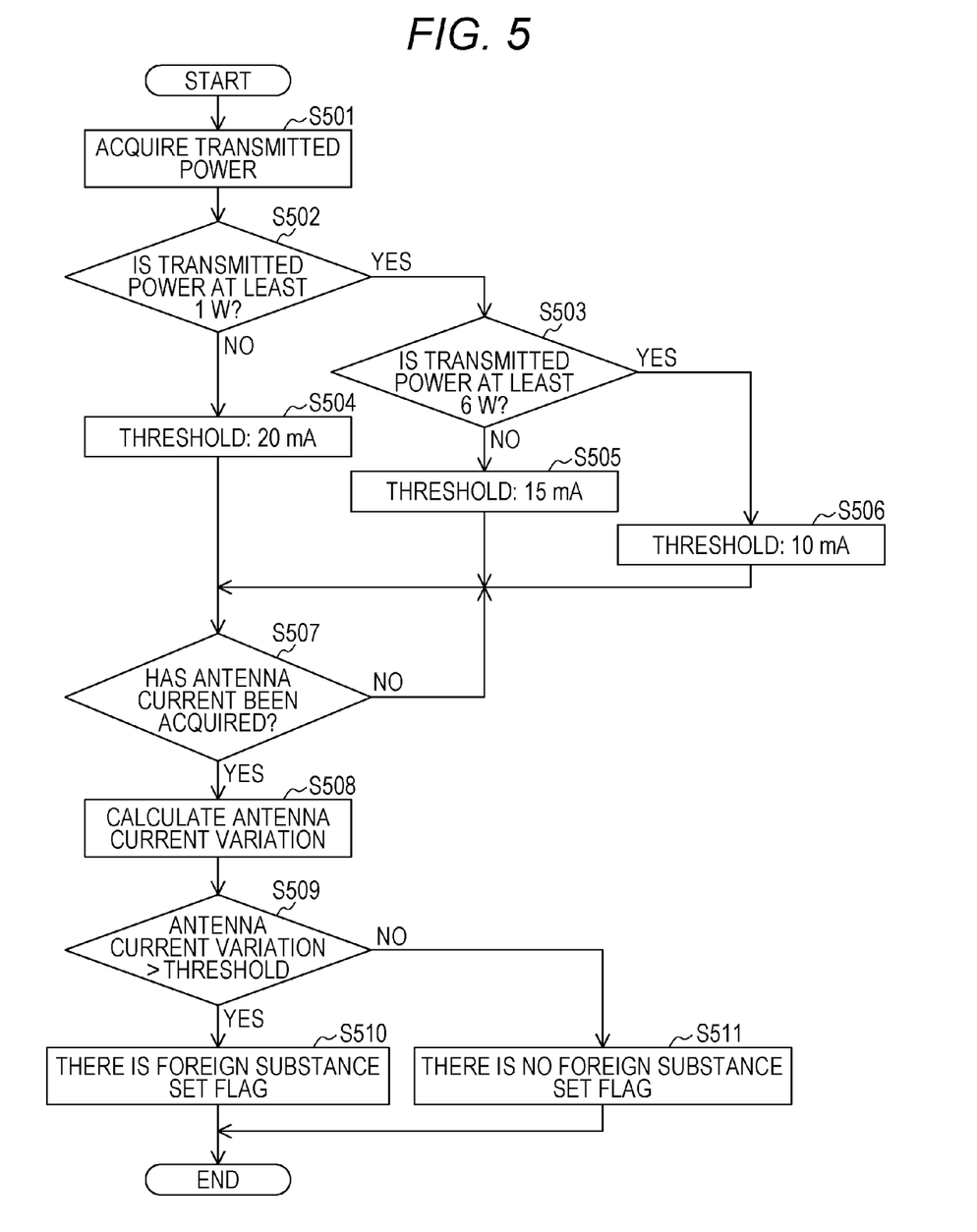
FIG. 5 is a chart for explaining another example of the foreign substance detection process performed in the power-transmitting apparatus 100.

FIG. 5 is a flowchart for explaining another operation of the foreign substance detection process (Step S306). Here, the presence of a foreign substance is determined by variation of an antenna current flowing through an antenna 101. A computer program that realizes the process of the flowchart illustrated in FIG. 5 is stored in a ROM 108, and a CPU 110 reads the computer program from the ROM 108 and executes the computer program, thereby realizing the process illustrated in FIG. 5.

In Step S501, the CPU 110 acquires transmitted power of a power-transmitting apparatus 100. The transmitted power is power output to an electronic device 200 from the power-transmitting apparatus 100 based on the transmitted power determined in Step S304. After acquiring the transmitted power, the CPU 110 proceeds to Step S502.

In Step S502, the CPU 110 determines whether the transmitted power acquired in Step S501 is at least 1 W. When the transmitted power acquired in Step S501 is at least 1 W (YES in Step S502), the CPU 110 proceeds to Step S503. When the transmitted power acquired in Step S501 is less than 1 W (NO in Step S502), the CPU 110 proceeds to Step S504.

In Step S503, the CPU 110 determines whether the transmitted power acquired in Step S501 is at least 6 W. When the transmitted power acquired in Step S501 is at least 6 W (YES in Step S503), the CPU 110 proceeds to Step S506. When the transmitted power acquired in Step S501 is less than 6 W (NO in Step S503), the CPU 110 proceeds to Step S505.

In Step S504, the CPU 110 sets an antenna current variation threshold to 20 mA, and proceeds to Step S507. In Step S505, the CPU 110 sets an antenna current variation threshold to 15 mA, and proceeds to Step S507. In Step S506, the CPU 110 sets an antenna current variation threshold to 10 mA, and proceeds to Step S507.

For example, when the transmitted power is 0.5 W, the antenna current variation threshold is 20 mA. When the transmitted power is 3 W, the antenna current variation threshold is 15 mA. When the transmitted power is 10 W, the antenna current variation threshold is 10 mA. As described above, the larger the transmitted power, the lower the antenna current variation threshold of the antenna 101 is set.

In Steps S504, S505, and S506, the antenna current variation of the antenna 101 means a current variation from a reference current value, and as the reference current value, a current flowing in the antenna 101 when there is no foreign substance is used.

In Step S507, the CPU 110 waits to acquire the magnitude of the antenna current flowing in the antenna 101. When the CPU 110 acquires the magnitude of the antenna current flowing in the antenna 101 (YES in Step S507), the CPU 110 proceeds to Step S508.

In Step S508, the CPU 110 calculates variation between a reference current amount of the antenna current (the magnitude of a current flowing in the antenna 101 when there is no foreign substance) and a current value acquired in Step S507. For example, in a case where the transmitted power is 0.5 W and the magnitude of a current flowing in the antenna 101 when there is no foreign substance (reference current amount) is 100 mA, and when the antenna current amount acquired in Step S507 is 130 mA, the antenna current variation is 30 mA. When the transmitted power is 0.5 W and the antenna current amount acquired in Step S507 is 85 mA, the antenna current variation is 15 mA. In a case where the transmitted power is 3 W and the reference current amount when there is no foreign substance is 150 mA, and when the antenna current amount acquired in Step S507 is 170 mA, the antenna current variation is 20 mA. When the transmitted power is 3 W and the antenna current amount acquired in Step S507 is 140 mA, the antenna current variation is 10 mA. After calculating the antenna current variation, the CPU 110 proceeds to Step S509.

In Step S509, the CPU 110 compares the antenna current variation calculated in Step S508 to the antenna current variation threshold determined in Step S504, S505, or S506.

When the antenna current variation obtained in Step S508 is greater than the antenna current variation threshold determined in Step S504, S505, or S506 (YES in Step S509), the CPU 110 proceeds to Step S510. When the antenna current variation obtained in Step S508 is less than or equal to the antenna current variation threshold determined in Step S504, S505, or S506 (NO in Step S509), the CPU 110 proceeds to Step S511.

In Step S510, the CPU 110 determines that there is a foreign substance, and sets a flag indicating that there is a foreign substance. In Step S511, the CPU 110 determines that there is no foreign substance, and sets a flag indicating that there is no foreign substance. In other words, the CPU 110 sets a foreign substance flag (foreign substance flag=1) when there is a foreign substance, and resets the foreign substance flag (foreign substance flag=0) when there is no foreign substance.

For example, when the transmitted power is 0.5 W and the antenna current variation of the antenna 101 is 30 mA, the expression of antenna current variation (30 mA)>antenna current variation threshold (20 mA) is satisfied, and thereby the CPU 110 determines that there is a foreign substance. When the transmitted power is 0.5 W and the antenna current variation of the antenna 101 is 15 mA, the expression of antenna current variation (15 mA)<antenna current variation threshold (20 mA) is satisfied, and thereby the CPU 110 determines that there is no foreign substance. When the transmitted power is 3 W and the antenna current variation of the antenna 101 is 20 mA, the expression of antenna current variation (20 mA)>antenna current variation threshold (15 mA) is satisfied, and thereby the CPU 110 determines that there is a foreign substance. When the transmitted power is 3 W and the antenna current variation of the antenna 101 is 10 mA, the expression of antenna current variation (10 mA)<antenna current variation threshold (15 mA) is satisfied, and thereby the CPU 110 determines that there is no foreign substance. When the transmitted power is 10 W and the antenna current variation of the antenna 101 is 12 mA, the expression of antenna current variation (12 mA)>antenna current variation threshold (10 mA) is satisfied, and thereby the CPU 110 determines that there is a foreign substance. When the transmitted power is 10 W and the antenna current variation of the antenna 101 is 7 mA, the expression of antenna current variation (7 mA)<antenna current variation threshold (10 mA) is satisfied, and thereby the CPU 110 determines that there is no foreign substance.

Although the presence of a foreign substance is determined based on the antenna current variation of the antenna 101 in the flow illustrated in FIG. 5, the presence of a foreign substance can be determined based on a voltage obtained by multiplying the antenna current flowing in the antenna 101 by a predetermined resistance. In that case, "current" may be replaced with "voltage" in the operation described with reference to FIG. 5.

The antenna current variation threshold is determined in accordance with the transmitted power. However, the antenna current variation threshold can be determined in accordance with the power classes of the power-transmitting apparatus 100 and the electronic device 200.

In the process illustrated in FIG. 5, the lower the transmitted power, the higher the antenna current variation threshold for foreign substance determination is set, and the higher the transmitted power, the lower the antenna current variation threshold is set. By doing so, there are fewer opportunities to determine that there is a foreign substance when the transmitted power is small. Consequently, power transmission to the electronic device 200 can be completed in a shorter period of time. On the other hand, when the transmitted power is high, foreign substances are positively determined, thereby increasing safety during the power transmission.

Third Embodiment

Figure 6:
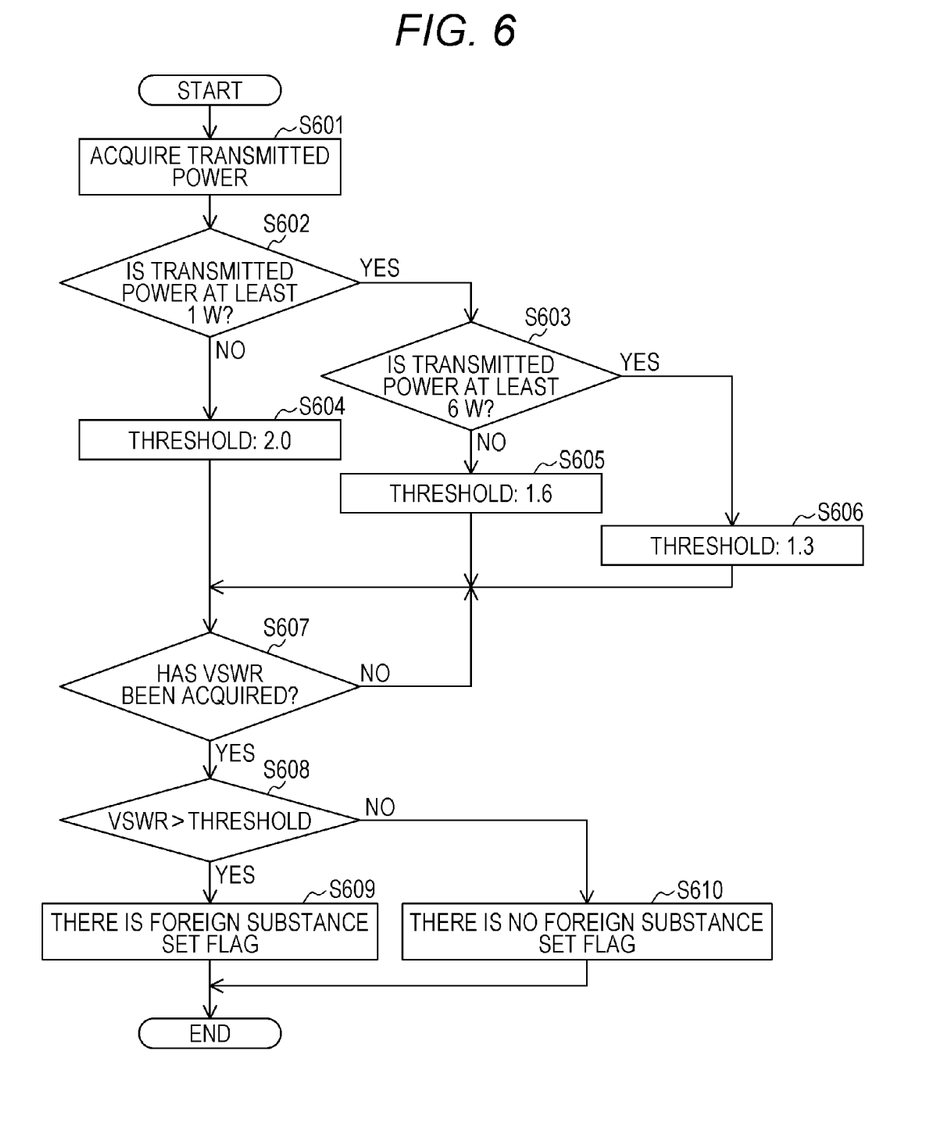
FIG. 6 is a chart for explaining still another example of the foreign substance detection process performed in the power-transmitting apparatus 100.

FIG. 6 is a flowchart for explaining still another operation of the foreign substance detection process (Step S306). Here, the presence of a foreign substance is determined by a voltage standing wave ratio (VSWR) in an antenna 101. A computer program that realizes the process of the flowchart illustrated in FIG. 6 is stored in a ROM 108, and a CPU 110 reads the computer program from the ROM 108 and executes the computer program, thereby realizing the process illustrated in FIG. 6.

In Step S601, the CPU 110 acquires transmitted power of a power-transmitting apparatus 100. The transmitted power is power output to an electronic device 200 from the power-transmitting apparatus 100 based on the transmitted power determined in Step S304. After acquiring the transmitted power, the CPU 110 proceeds to Step S602.

In Step S602, the CPU 110 determines whether the transmitted power acquired in Step S601 is at least 1 W. When the transmitted power acquired in Step S601 is at least 1 W (YES in Step S602), the CPU 110 proceeds to Step S603. When the transmitted power acquired in Step S601 is less than 1 W (NO in Step S602), the CPU 110 proceeds to Step S604.

In Step S603, the CPU 110 determines whether the transmitted power acquired in Step S601 is at least 6 W. When the transmitted power acquired in Step S601 is at least 6 W (YES in Step S603), the CPU 110 proceeds to Step S606. When the transmitted power acquired in Step S601 is less than 6 W (NO in Step S603), the CPU 110 proceeds to Step S605.

In Step S604, the CPU 110 sets a voltage standing wave ratio threshold as a foreign substance detection threshold to 2.0, and proceeds to Step S607. In Step S605, the CPU 110 sets a voltage standing wave ratio threshold as a foreign substance detection threshold to 1.6, and proceeds to Step S607. In Step S606, the CPU 110 sets a voltage standing wave ratio threshold as a foreign substance detection threshold to 1.3, and proceeds to Step S607. For example, when the transmitted power is 0.5 W, the voltage standing wave ratio threshold is 2.0. When the transmitted power is 3 W, the voltage standing wave ratio threshold is 1.6. When the transmitted power is 10 W, the voltage standing wave ratio threshold is 1.3. As described above, the larger the transmitted power, the lower the voltage standing wave ratio threshold is set.

The voltage standing wave ratio is a value indicating a relationship between a travelling wave of power output from the antenna 101 and a reflected wave of power output from the antenna 101. The CPU 110 determines the voltage standing wave ratio, for example, from an internal voltage of a matching circuit 102.

In Step S607, the CPU 110 determines whether the voltage standing wave ratio has been acquired. When the CPU 110 acquires the voltage standing wave ratio (YES in Step S607), the CPU 110 proceeds to Step S608. When the CPU 110 does not acquire the voltage standing wave ratio (NO in Step S607), the CPU 110 returns to Step S607.

In Step S608, the CPU 110 compares the voltage standing wave ratio obtained in Step S607 to the voltage standing wave ratio threshold determined in Step S604, S605, or S606. When the voltage standing wave ratio obtained in Step S607 is greater than the voltage standing wave ratio threshold determined in Step S604, S605, or S606 (YES in Step S608), the CPU 110 proceeds to Step S609. When the voltage standing wave ratio obtained in Step S607 is less than or equal to the voltage standing wave ratio threshold determined in Step S604, S605, or S606 (NO in Step S608), the CPU 110 proceeds to Step S610.

In Step S609, the CPU 110 determines that there is a foreign substance, and sets a flag indicating that there is a foreign substance. In Step S610, the CPU 110 determines that there is no foreign substance, and sets a flag indicating that there is no foreign substance. In other words, the CPU 110 sets a foreign substance flag (foreign substance flag=1) when there is a foreign substance, and resets the foreign substance flag (foreign substance flag=0) when there is no foreign substance.

For example, when the transmitted power is 0.5 W and the voltage standing wave ratio is 2.2, the expression of voltage standing wave ratio (2.2)>voltage standing wave ratio threshold (2.0) is satisfied, and thereby the CPU 110 determines that there is a foreign substance. When the transmitted power is 0.5 W and the voltage standing wave ratio is 1.8, the expression of voltage standing wave ratio (1.8)<voltage standing wave ratio threshold (2.0) is satisfied, and thereby the CPU 110 determines that there is no foreign substance. When the transmitted power is 3 W and the voltage standing wave ratio is 1.8, the expression of voltage standing wave ratio (1.8)>voltage standing wave ratio threshold (1.6) is satisfied, and thereby the CPU 110 determines that there is a foreign substance. When the transmitted power is 3 W and the voltage standing wave ratio is 1.5, the expression of voltage standing wave ratio (1.5)<voltage standing wave ratio threshold (1.6) is satisfied, and thereby the CPU 110 determines that there is no foreign substance. When the transmitted power is 10 W and the voltage standing wave ratio is 1.5, the expression of voltage standing wave ratio (1.5)>voltage standing wave ratio threshold (1.3) is satisfied, and thereby the CPU 110 determines that there is a foreign substance. When the transmitted power is 10 W and the voltage standing wave ratio is 1.2, the expression of voltage standing wave ratio (1.2)<voltage standing wave ratio threshold (1.3) is satisfied, and thereby the CPU 110 determines that there is no foreign substance.

In the flow illustrated in FIG. 6, when the transmitted power is low, the voltage standing wave ratio threshold for determining the presence of a foreign substance is set high, and when the transmitted power is high, the voltage standing wave ratio threshold is set low. By doing so, there are fewer opportunities to determine that there is a foreign substance when the transmitted power is small. Consequently, power transmission to the electronic device 200 can be completed in a shorter period of time. On the other hand, when the transmitted power is high, foreign substances are positively determined, thereby increasing safety during the power transmission.

Although the voltage standing wave ratio threshold is determined in accordance with the transmitted power in the flow illustrated in FIG. 6, the voltage standing wave ratio threshold can be determined in accordance with the power classes of the power-transmitting apparatus 100 and the electronic device 200.

Although a foreign substance detection unit is realized by the computer program operated on the CPU 110, the foreign substance detection unit can be prepared separately from the CPU 110.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209477, filed Oct. 26, 2015, which is hereby incorporated by reference herein in its entirety.

What is claimed is:

1. A power-transmitting apparatus that wirelessly transmits power to a power-receiving apparatus, the power-transmitting apparatus comprising:
   an antenna configured to wirelessly output power; and
   a control unit;
   wherein the control unit performs:
   detecting the presence of a foreign substance between the power-receiving apparatus and the power-transmitting apparatus; and
   adjusting power to be transmitted to the power-receiving apparatus through the antenna in accordance with a detection result of detecting the presence of a foreign substance,
   wherein the control unit is configured to determine, in accordance with a foreign substance detection threshold determined according to maximum power transmittable to the power-receiving apparatus, whether the foreign substance necessitates control of power to be transmitted to the power-receiving apparatus, and
   wherein the foreign substance detection threshold is determined in accordance with a maximum transmittable power of the power-transmitting apparatus or maximum receivable power of the power-receiving apparatus, whichever is smaller.

2. The power-transmitting apparatus according to claim 1, wherein the foreign substance detection threshold is determined in accordance with a power class that defines power transmittable by the power-transmitting apparatus and a power class that defines power receivable by the power-receiving apparatus.

3. The power-transmitting apparatus according to claim 1, wherein the foreign substance detection threshold is a power efficiency threshold, and
wherein the higher the maximum power transmittable to the power-receiving apparatus, the higher the power efficiency threshold.

4. The power-transmitting apparatus according to claim 1, wherein the foreign substance detection threshold is a threshold for variation of a current flowing in the antenna, and
wherein the higher the maximum power transmittable to the power-receiving apparatus, the lower the threshold.

5. The power-transmitting apparatus according to claim 1, wherein the control unit comprises a unit configured to detect a voltage standing wave ratio of the antenna,
wherein the foreign substance detection threshold is a threshold for the voltage standing wave ratio, and
wherein the higher the maximum power transmittable to the power-receiving apparatus, the higher the threshold.

6. The power-transmitting apparatus according to claim 1, further comprising a communication unit configured to communicate with the power-receiving apparatus.

7. The power-transmitting apparatus according to claim 6, wherein the communication unit is configured to communicate with the power-receiving apparatus by using a power signal transmitted to the power-receiving apparatus by the antenna.

8. A method for controlling a power-transmitting apparatus that wirelessly transmits power to a power-receiving apparatus, the method comprising:

wirelessly outputting power;

detecting, in accordance with a foreign substance detection threshold determined according to maximum power transmittable to the power-receiving apparatus, whether there is a foreign substance between the power-receiving apparatus and the power-transmitting apparatus; and adjusting the power to be transmitted to the power-receiving apparatus based on whether a foreign substance is detected, wherein the foreign substance detection threshold is determined in accordance with a maximum transmittable power of the power-transmitting apparatus or maximum receivable power of the power-receiving apparatus, whichever is smaller.

9. A computer-readable storage medium storing computer executable instructions for causing a computer to execute a method for controlling a power-transmitting apparatus that wirelessly transmits power to a power-receiving apparatus, the method comprising:

wirelessly outputting power;

detecting, in accordance with a foreign substance detection threshold determined according to maximum power transmittable to the power-receiving apparatus, whether there is a foreign substance between the power-receiving apparatus and the power-transmitting apparatus; and adjusting the power to be transmitted to the power-receiving apparatus based on whether a foreign substance is detected, wherein the foreign substance detection threshold is determined in accordance with a maximum transmittable power of the power-transmitting apparatus or maximum receivable power of the power-receiving apparatus, whichever is smaller.

* * * * *